US009293011B2

(12) United States Patent
Cuddy

(10) Patent No.: US 9,293,011 B2
(45) Date of Patent: Mar. 22, 2016

(54) SYSTEM AND METHOD FOR PROVIDING A COMMUNITY BINGO GAME

(71) Applicant: Video Gaming Technologies, Inc., Franklin, TN (US)

(72) Inventor: Ryan Cuddy, Reno, NV (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

(21) Appl. No.: 13/829,305

(22) Filed: Mar. 14, 2013

(65) Prior Publication Data

US 2014/0274277 A1 Sep. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/3267* (2013.01); *G07F 17/329* (2013.01); *G07F 17/3272* (2013.01)

(58) Field of Classification Search
USPC .......... 463/19
See application file for complete search history.

(56) References Cited

U.S. PATENT DOCUMENTS

| | | | | |
|---|---|---|---|---|
| 7,713,124 | B2 * | 5/2010 | Cuddy et al. | 463/26 |
| 2005/0119042 | A1 * | 6/2005 | Chamberlain et al. | 463/19 |
| 2007/0105615 | A1 * | 5/2007 | Lind | 463/17 |

* cited by examiner

*Primary Examiner* — Kevin Y Kim
(74) *Attorney, Agent, or Firm* — Armstrong Teasdale LLP

(57) ABSTRACT

A game system and method plays an electronic provides an electronic community bingo game. The electronic community bingo game is initiated on a predetermined periodic time period and has a predetermined qualifying basis. Each player's entry into the electronic community bingo game is normalized as a function of the respective player's wagers and the predetermined qualifying basis.

35 Claims, 5 Drawing Sheets

SYSTEM AND METHOD FOR PROVIDING A COMMUNITY BINGO GAME

FIELD OF THE INVENTION

The present invention relates generally to electronic games, and more particularly, to a system and method for providing a community bingo game electronic.

BACKGROUND OF THE INVENTION

In some jurisdictions, wagering is permitted on certain types of games, e.g., Bingo, lotteries, pull-tabs, is allowed. The types of games may be electronic.

In one scenario, an electronic base game, such as bingo, is provided in which players compete at the same time or with and against each other. A minimum of number of players, e.g., two, is needed. Each player uses a player terminal which is inter-linked, e.g., via an Ethernet network, to a central server. To initiate the play of the game, a player inserts credits or coins, or currency into the player terminal. The coins or currency may be converted into credits. The number of credits are added to a credit meter and displayed on a display screen.

If the game being played is Bingo, the player selects the level of play by pressing a "bet" button to set the wager amount for a bingo card. The player may then initiate the bingo game by pressing a "play" button.

The game is not played or initiated until the required number of players have joined the game. The server, after determining that enough players have entered the game, randomly determines a string of numbers and transmits the numbers to the player terminals. These are daubed, automatically or by the player, onto their card(s).

Each game typically has a plurality of defined interim patterns and a game-ending pattern. As soon, as the string of numbers results in the game ending pattern for one of the players on one of the cards, the bingo game is over and no additional numbers are transmitted. The player(s) who have achieved one of the interim patterns and/or the game-ending or winning pattern is awarded a payout, in terms of credits, according to a pay table which may be traded in for cash.

The base game need not be bingo and may not require that the players are playing against each other.

In order to maintain or increase player interest in the game, however, it is common to provide additional features or bonus games. These features or bonus games may be provided individually or communally. In a community game one of the issues presented is how to account for different rates of play of the individual players.

The present invention is aimed at one or more of the problems identified above.

SUMMARY OF THE INVENTION

In a first aspect of the present invention, a game system provides an electronic community bingo game. The game system includes a first game device, a second game device, and a bonus game controller. The first game device allows a first player to place wagers on a base game and the electronic community bingo game. The second game device allowing a second player to place wagers on the base game and the electronic community bingo game. The bonus game controller is coupled to the player game devices for providing the electronic community bingo game to the first and second players. The electronic community bingo game is initiated on a predetermined periodic time period and has a predetermined qualifying basis. The bonus game controller or the game device normalizes each player's entry into the electronic community bingo game as a function of the respective player's wagers and the predetermined qualifying basis.

In a second aspect of the present invention, a method provides an electronic base game and an electronic community bingo game. The method includes the steps of allowing a first player to place wagers on the base game and the electronic community bingo game, allowing a second player to place wagers on the base game and the electronic community bingo game, and providing the electronic community bingo game to the first and second players. The electronic community bingo game is initiated on a predetermined periodic time period and has a predetermined qualifying basis. Each player's entry into the electronic community bingo game is normalized as a function of the respective player's wagers and the predetermined qualifying basis.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
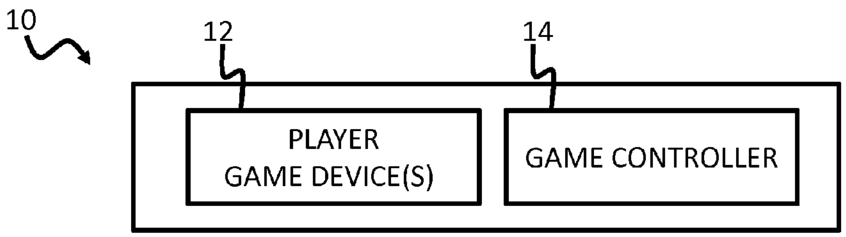
FIG. 1 is block diagram of a game system for providing a base game and an electronic community bingo game to one or more players, according to an embodiment of the present invention.

With reference to the drawings and in operation, the present invention provides a game system 10 for playing an electronic game, i.e., a base game and providing an electronic community bingo game. With particular reference to FIG. 1, the game system 10 includes a plurality of player game devices or terminals 12 and a game controller 14.

The player game devices 12 allow respective players to place a wager and initiate the base game. In one embodiment, the game controller 14 is coupled to the player game devices 12 for playing the base game and establishing an outcome of the base game.

In another embodiment, each player game device 12 may have an associated game controller 14 which acts independently, i.e., plays the base game and establishes the outcomes thereof.

The outcome of the electronic game may include a payout according to a first pay table if a set of predetermined winning conditions has been achieved.

The electronic game may be any type of game which has an outcome and provides a payout. For example, the types of electronic games may include, but is not limited to, bingo and similar games, slot machines, casino games, card games, dog or horse racing, lotteries, and all other forms of gaming. For purposes of illustration only, the present invention is described below in terms of bingo, but the present invention is not limited to such.

Figure 2:
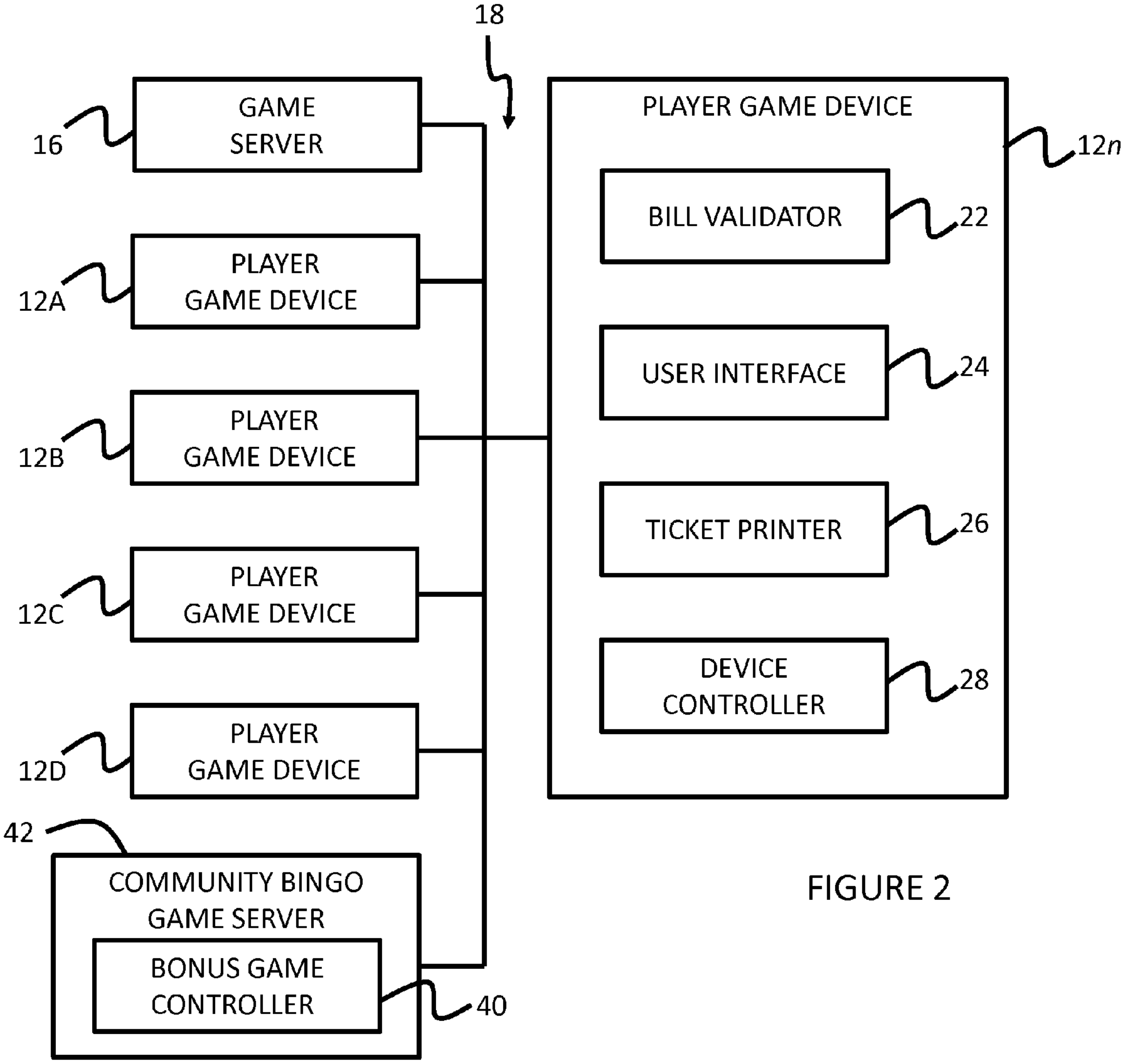
FIG. 2 is a block diagram of a game system for providing a base game and an electronic community bingo game to one or more players, according to another embodiment of the present invention.

With particular reference to FIG. 2 in one embodiment, a plurality of player game devices 12A, 12B, 12C . . . , 12*n* are connected to a server 16 are provided. The game controller 14 is implemented by the server 16. Each player game device 12 may be connected to the server 16 by a network link 18 or some other suitable method.

The player game device 12 allows a player to place a wager and purchase an electronic bingo card. In one embodiment, the electronic bingo card is a 5×5 grid with the columns labeled B, I, N, G, and O, respectively. The center cell may be a "free" cell.

Each Bingo game has at least one winning pattern. A winning pattern is a sub-set of the cells of the grid which trigger an award or payout. The amount of the award or payout may dependent upon the wager made by the player and a predetermined pay table. In one embodiment, each Bingo game has a game-ending pattern which signifies the end of the game. For example, the game-ending pattern may include all of the cells of the electronic bingo card. The payout associated with the game-ending pattern is paid to the first player who achieves the game-ending pattern.

One or more interim winning patterns may also be included. The interim winning patterns may provide a payout, without ending the game, as a function of the player's wager and a second pay table. The interim winning patterns may have other conditions associated therewith. For example, in order for a payout to occur, the interim winning pattern must be achieved within a predetermined number of the randomly drawn numbers.

The game controller 14 is coupled to the player game device 12 and establishes a set of chosen numbers. In one embodiment, the set of chosen numbers are randomly chosen using a random number generator (not shown). In one embodiment, there are a predetermined number of numbers in the set of chosen numbers, e.g., seventy-five. In one embodiment, the predetermined number of numbers in the set of chosen numbers are established within a predetermined period of time, e.g., approximately 10 seconds.

The game controller 14 compares the set of randomly chosen numbers and the player(s)'s bingo card(s) with the associated winning pattern and establishing an outcome of the electronic bingo game. The outcome of the electronic bingo game may include a payout according to a first pay table if the winning pattern has been achieved. The winning pattern may be the game ending pattern and/or one or more interim winning patterns. In other words, the outcome of the electronic bingo game may include a payout to the player if the game ending pattern is achieved and, alternatively or in addition, may include a second payout if an interim winning pattern is achieved.

The outcome of the electronic bingo game may be a "loss" if no winning pattern is achieved after all numbers have been selected or another player achieves the game winning pattern.

After the Bingo game has been played, the game controller 14 may simulate the outcome of the base game as a different type of game, including but not limited to a slot machine (using video of mechanical reels), blackjack game, keno, or any other suitable game. This simulation may be on the player game device 12.

With specific reference to FIG. 2, the player game device 12 may be a stand-alone device, console, upright machine, smartphone, laptop, personal computer, tablet, or other suitable device, which is connected to the server 16 via, for example, a network link. In one embodiment, the player game devices 12 may include a bill validator 22, a user interface 22, a ticket printer 26, and a device controller 28.

To initiate the play of the game, a player inserts credits or coins, or currency into the player game device 12. Coins may be inserted into a coin acceptor (not shown) if provided. Currency may be inserted into the bill validator 22. The coins or currency may be converted into credits. Alternatively or in addition, the player may insert a ticket or card having a number of credits represented thereon or may insert a player tracking card to access credits in a player account.

The user interface device 24 allows interaction between the player game device 12, the game controller 14, and the player. The user interface device 24 includes a display screen and a plurality of buttons (see not shown). In one embodiment, the user interface device 24 includes a touch-screen device (not attached). User input buttons are implemented by the touch screen. Alternatively, or in addition, other input buttons may be implemented by mechanical push-buttons. The number of credits or currency input by the player are added to a credit meter and displayed on a display screen of the player game device 12.

The user interface device 24 may also provide a menu button. The player may access additional functions via the menu button. For example, the menu button provides the player with an opportunity, through a menu item, to cash out. In one embodiment, in response to the player choosing to cash out, a ticket representing the remaining credits on the credit meter is printed by the ticket printer. The printed ticket may be redeemed for cash at a kiosk or cashier station.

The bill validator 22, the user interface device 24, and the ticket printer 26 are coupled to and controlled by the device controller 28. The device controller 28 also manages communications to and between the server 16.

In another aspect of the present invention, the player game device 12 allows the player to purchase additional electronic bingo cards, prior to any player achieving the game ending pattern or the last number in the set of chosen numbers having been chosen.

The game controller 14 may be implemented by a game server 16.

A bonus game controller 40 which is coupled to the player game device 12 and provides the electronic community bingo game. The electronic community bingo game is initiated on a predetermined periodic time period, e.g., every 0.5 or 1.0 seconds. The bonus game controller 40 may be implemented in a separate community bingo server 42 or may be implemented on the game server 16. Each players' wagers may vary in terms of, e.g., frequency and size. In one aspect of the present invention, the players' entry into the electronic community bingo game may be normalized, taking into account the variations in the players' wagers, e.g., the frequency and size of the wagers.

In one embodiment of the present invention, the normalization function is performed by the bonus game controller 40. In another embodiment of the present invention, the normalization function is performed by the respective player game device 12.

In one aspect of the present invention, the electronic community bingo game has a predetermined qualifying basis determined as a function of the wagers made by one of the players, wherein the bonus game controller normalizes each player's entry into the electronic community bingo game as a function of the respective player's wagers.

It should be noted that, unlike the base game, which is only initiated when predetermined condition(s) have been met, i.e., each player independently initiates game play, or the predetermined number of players are ready, the electronic community bingo game is automatically initiated at the beginning of each predetermined periodic time period. Thus, the electronic community bingo is played or run, independent of how many players have qualified. If zero players have qualified, the electronic community bingo game is still run, but with no players. If only one player has qualified, the electronic bingo game is run with just one player.

With reference to FIGS. 3-8, several examples will be discussed with respect to a first player and a second player. The first player makes wagers on the base game and the electronic community bingo game via a first game device (game device 12A). The second player makes wagers on the base game and the electronic community bingo game via a second game device (game device 12B).

In one aspect, the electronic community bingo game is optional, i.e., each player may decide, independently, whether or not to participate in the electronic community bingo game. There may be a separate wager for participation in the electronic community bingo game.

Alternatively, the electronic community bingo game may not be optional, i.e., the players must participate in the electronic community bingo game.

In one aspect, the player's wagers on the electronic community bingo game (or a portion of the players' wagers on the main game) are used to fund to the electronic community bingo game, i.e., create one or more pools of funds from which any awards associated with the electronic community bingo game are paid.

As will be discussed in more detail below, the electronic community bingo game has a predetermined qualifying basis. The bonus game controller 40 or the respective player game device 12, in normalizing the first player's entry into the electronic community bingo game, qualifies the first player for entry into the electronic community bingo game as a function of the wagers made by the first player at the first game device and enters the first player into a first next instance of the electronic community bingo game after the first player qualifies. Also, the bonus game controller 40 or the respective player game device 12, in normalizing the second player's entry into the electronic community bingo game, qualifies the second player for entry into the electronic community bingo game as a function of the wagers made by the second player places at the second game device and enters the second player into a second next instance of the electronic community bingo game after the second player qualifies.

The first and second next instances of the electronic community bingo game are determined independently, i.e., the next instance of the electronic community bingo game after the respective player qualifies. The first and second instances may be the same instance of the electronic community bingo game.

In one aspect of the present invention, the bonus game controller or the respective player game device 12, establishes a community bingo game qualifying factor for each player after each wager made by the respective player.

For example, the community bingo game qualifying factor for each player may be associated with each play of the base game and/or may be related to the contribution to a community bingo game pool (of funds) from the player's wager.

The bonus game controller establishes an outcome of each instance of the electronic community bingo game and awards an award to each player who has qualified for the respective instance of the electronic community bingo game as a function of the community bingo game qualifying factor, an electronic community bingo game pay table, and the outcome of the respective instance of the electronic community bingo game.

In one aspect of the present invention, each qualifying player is provided at least one community bingo card for each instance of the electronic community bingo for which the qualifying player qualifies. The number of qualifying bingo cards provided to the qualifying player for each instance of the electronic community game is a function of the community bingo game qualifying factor (see below).

As in the electronic bingo game of the main game (if the main game is a electronic bingo game), the player may be awarded an award (or multiple awards) if outcome of the electronic community bingo game includes a matching condition of an interim or game-ending pattern on the least one community bingo card.

The bonus game controller establishes an initial award value as a function of the outcome of the electronic community bingo game and the electronic community bingo game pay table, the award being a function of the initial award value and the community bingo game qualifying factor. The game system may establish a multiplier as a function of the community bingo game qualifying factor. The award awarded to the player may be established by multiplying the initial award value by the multiplier.

Figure 3:
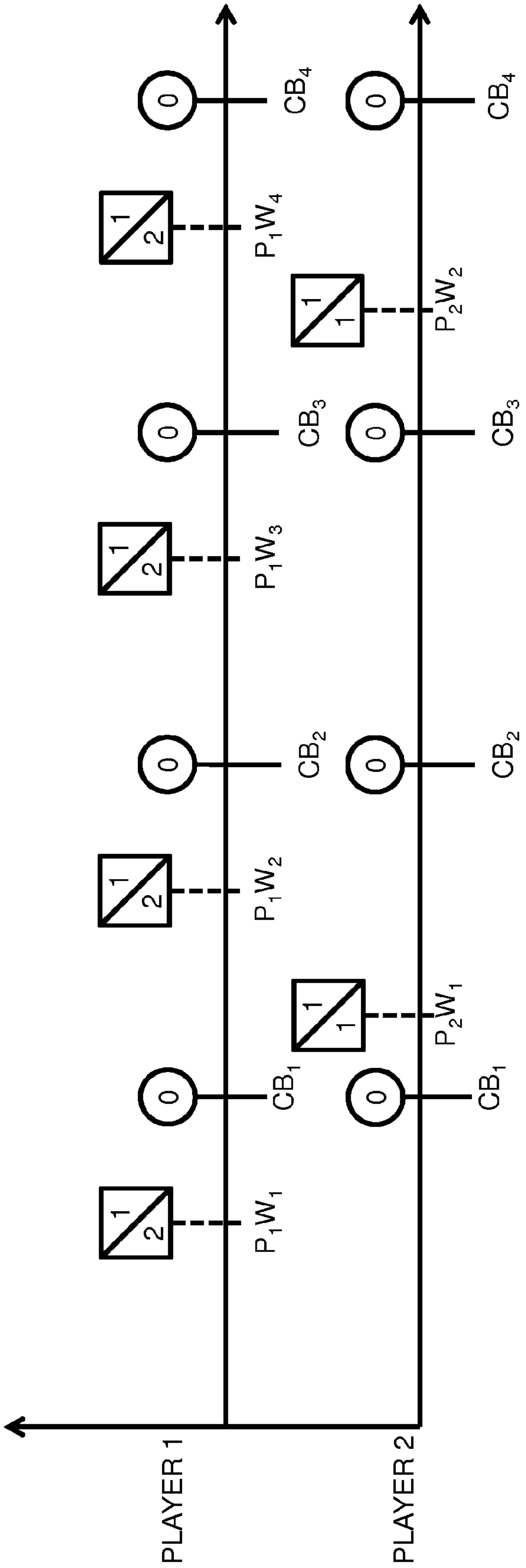
FIG. 3 is a first time line illustrating an exemplary operation of the present invention, according to an embodiment of the present invention.

With specific reference to FIG. 3, in one embodiment of the present invention the bonus game controller 40 or the respective player game device 12 establishes a community bingo game qualifying factor for each player after each wager made by the respective player and adds the community bingo game qualifying factor to a respective aggregate factor for each player.

A time line of the play of Player 1 and Player 2 is shown relative to the automatic play of four electronic community bingo games, played at respective times of $CB_1$, $CB_2$, $CB_3$, and $CB_4$.

For purposes of the discussion, each player makes a standard wager (although in other embodiments, the player may make other wagers which may be, but are not necessarily, multiples of the standard wager). Furthermore, for each standard wager, a predetermined qualifying factor is added to an aggregate factor. In other words, the aggregate factor is a running total of the accumulated community bingo game qualifying factors for each player. In the illustrated timelines, in each square (wager indicia) at the respective wager times, $P_1W_1$, $P_1W_2$, $P_1W_3$, $P_1W_4$, $P_2W_1$, $P_2W_2$, $P_2W_3$, $P_2W_4$, the number in the top right corner represents the qualifying factor contributed on the basis of the instant wager. The number in the bottom left corner is the aggregate factor. At each community bingo game time, $CB_1$, $CB_2$, $CB_3$, $CB_4$, the number in the circle (community bingo game indicia) represents the respective player's aggregate factor, after the cost of the community bingo game is subtracted from the player's aggregate factor (see below).

Furthermore, when one of the players qualifies for the electronic community bingo game, i.e., if the respective aggregate factor is greater or equal to a minimum qualifying factor, the minimum qualifying factor is subtracted from the respective aggregate factor. The bonus game controller establishes an outcome of each instance of the electronic community bingo game and, if a player has qualified, awards an award as a function of an electronic community bingo game pay table and the outcome of the respective instance of the electronic community bingo game.

For example, as shown in FIG. 3, Player 1 makes a wager and plays the base game at times $P_1W_1$, $P_1W_2$, $P_1W_3$, $P_1W_4$. In the wager icon, the number in the upper right corner represents the qualifying factor for current wager/play of the base game and the number in the bottom left corner represents the aggregate factor.

At t=0, each player has an aggregate factor of zero. In this example, Player 1 makes the standard wager and the qualifying factor is "1" for each standard wager. At time $P_1W_1$, Player 1 makes a standard wager and plays the base game and obtains an electronic community bingo game qualifying factor of 1. This is added to the aggregate factor of Player 1, thus the aggregate factor of Player 1 at $P_1W_1$ is also 1.

The first electronic community bingo game is played at time $CB_1$. In this example, the qualifying basis of the electronic community bingo game is 1. Since Player 1's aggregate factor is greater than or equal to the qualifying basis, Player 1 qualifies for the first electronic community bingo game. Player 1 is entered into the first electronic community bingo game and any resulting awards are awarded to the player. Furthermore, the qualifying basis, i.e., its cost factor, is subtracted from Player 1's aggregate factor, which is now 0 (electronic community bingo indicia at $CB_1$).

As shown, Player 1 continues to wager and play the base game at roughly the same rate at which the electronic community bingo game is played. Thus, Player 1 will qualify for the second through fourth electronic community bingo games. In this example, after each play of the base game, the aggregate factor will be increased by 1 (the qualifying factor for each standard wager). Each play of the electronic community bingo game will result in a reduction of the aggregate factor by 1 (the qualifying or cost basis of the electronic community bingo game), resulting in an aggregate factor of 0.

Player 2 is playing at roughly half the rate of Player 1. At the time the first electronic community bingo game is played, $CB_1$, Player 2 has not played the base game, thus Player 2's aggregate factor remains at 0. At time, $P_2W_1$, Player 2 plays the base game (with the standard wager), thus Player 2 achieves an electronic community bingo game qualifying factor of 1, which is added to Player 2's aggregate factor as shown. Thus, Player 2 will qualify for the second electronic community bingo game, at time $CB_2$. Once qualified, Player 2's aggregate factor will be reduced by the cost basis of the electronic community bingo game. Thus, Player 2's aggregate factor after $CB_2$ will be 0 and Player 2 will not qualify for the third electronic community bingo game (at time $CB_3$), but will qualify for the fourth electronic community bingo game (at time $CB_4$).

In the above example, each standard wager resulted in a qualifying factor of 1, which was also the qualifying basis for the electronic community bingo game. It should be noted that these numbers (and whole numbers in general where used) are used solely for simplicity and discussion purposes.

In another aspect of the present invention, any one of the numbers used may not be limited to a whole number.

Figure 4:
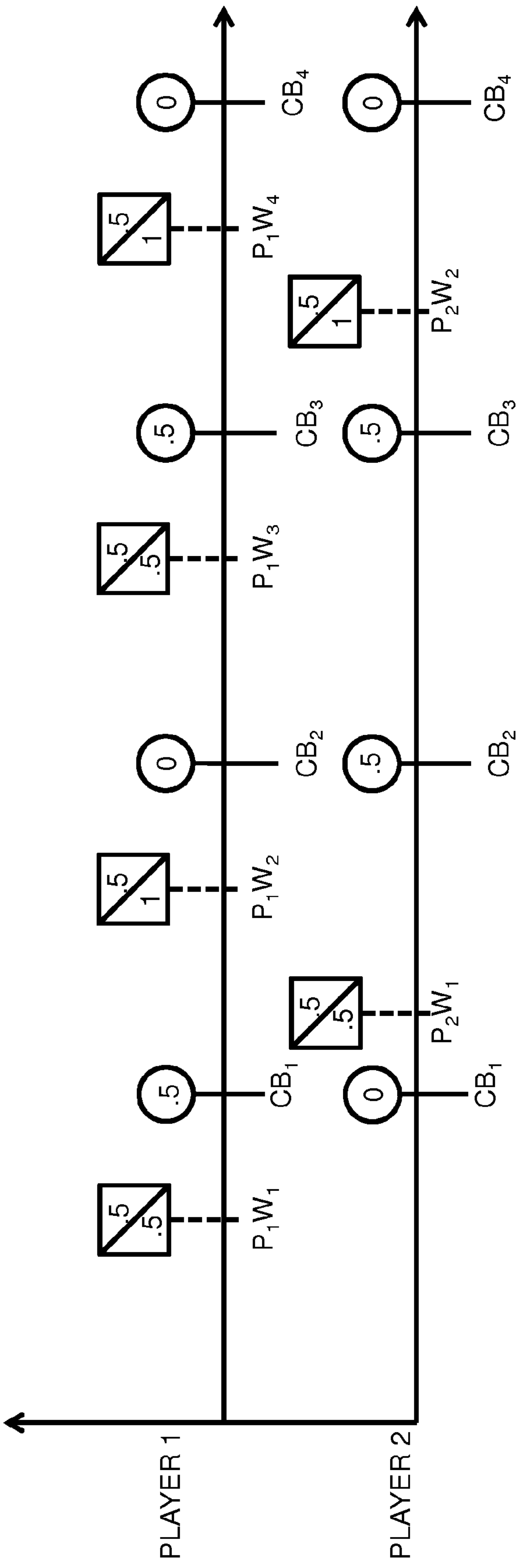
FIG. 4 is a second time line illustrating a second exemplary operation of the present invention, according to an embodiment of the present invention.

For example, with respect to FIG. 4, the qualifying factor associated with each standard wager is 0.5. For purposes of comparison purposes, however, in this example the other numbers remain the same, i.e., each player makes a standard wager and the qualifying basis of the electronic community bingo game is 1, and furthermore, the number and timing of each players' wagers remain the same as in the preceding example.

At time $P_1W_1$, Player 1 makes a standard wager and plays the base game. Since the qualifying factor associated with a standard wager is 0.5 (top, right of the wager indicia at $P_1W_1$), the accumulated factor is 0.5 (bottom, left of wager indicia at $P_1W_1$). At $CB_1$, Player 1's accumulated factor is less than the qualifying basis of the electronic community bingo game, therefore, Player 1 does not qualify for the first electronic community bingo game. Player 1's aggregate factor remains at 0.5. At $P_1W_2$, Player 1 makes another standard wager and plays the base game. The qualifying factor of 0.5 is added to Player 1's aggregate factor (which is now 1). Thus Player 1 will qualify for the second electronic community bingo game (at time $CB_2$). The qualifying basis of 1 will then be deducted from Player 1's aggregate factor, which is now at 0 (electronic community bingo game indicia at $CB_2$).

Player 1 continues to play at the same pace (with a standard wager), thus Player 1 does not qualify for the third electronic community bingo game (at time CB3), but does qualify for the fourth electronic community bingo game (at time CB4). In the previous example of FIG. 3, Player 1 qualified for every instance of the electronic community bingo game. In this example, Player 1 played at the same rate with the same wager. However, since the qualifying factor is half the qualifying factor of the previous example, Player 1 qualifies for every other electronic community bingo game.

In the example, of FIG. 4, Player 2 plays at roughly half the rate of play of Player 1. As shown, at time $CB_1$ Player 2 has not played the base game so the accumulated factor of Player 2 is 0 (electronic community bingo game indicia at $CB_1$). Therefore, Player 2 does not qualify for the first electronic communication bingo game. At time $P_2W_1$, Player 2 plays the base game (with a standard wager), thus, Player 2's accumulated factor, at $P_2W_1$ is 0.5.

At time $CB_2$, Player 2 does not qualify for the second electronic community bonus game since Player's 2 accumulated factor (0.5) does not meet the qualify basis (1).

Since Player 2 has not played another base game before $CB_3$, Player 2 also does not qualify for the third electronic community bingo game.

At time $P_2W_2$, Player 2 plays another instance of the base game with a standard wager. Player 2's accumulated factor is thus increased by 0.5 and is now 1. Thus, at time $CB_4$, Player 2 qualifies for the fourth instance of the electronic community bingo game. The accumulated factor is then reduced by the qualifying factor.

In each of the previous two examples, each player has either not qualified for the electronic community bingo game or has just qualified, e.g., the player's accumulated factor is equal to the qualifying factor. However, in some instances a player's accumulated factor may be greater than the qualifying factor. If the player's accumulated factor is greater than the qualifying factor, but less than 2 times (2×) the qualifying factor, the qualifying factor is subtracted from the accumulated factor, leaving the remainder, when the player has qualified (see above).

If the player's accumulated factor is greater than 2× the qualifying factor, then the player's accumulated factor could increase at a pace greater than it is being "used" to qualify for the electronic community bingo game.

This situation may be handled in a various number of ways.

First, the player's accumulated factor could be allowed to accumulate. Once the player has stopped playing, the system 10 may continue to enter or qualify the player for the electronic community bingo game until the accumulated factor has reached zero or is less than the qualifying factor. The player may be notified on the respective player game device 12 that this is occurring. Any winnings or awards may be provided at the player game device or stored in a player account on a player tracking system (not shown), on the bonus game controller 40 or the community bingo game server 42.

Alternatively, or in addition, the player's entry into the electronic community bingo game could be modified.

For instance, if a player's accumulated factor is greater than M times (Mx) the qualifying factor, then a parameter of the electronic community bingo game may be modified by Mx and the player's accumulated factor would also be reduced by MX=x the qualifying factor. In one embodiment, M may be chosen as the greatest multiplier of the qualifying factor which the player's accumulated factor exceeds or may be a predetermined factor, e.g., 2 or 3. However, M may be chosen using any other suitable method as well.

In one aspect of the present invention, the parameter of the electronic community bingo game may be at least one of: (a) any award awarded by the respective instance of the electronic community bingo game or (b) the number of bingo cards provided to the player for that instance of the electronic community bingo game.

For instance, if the player is awarded an award based on the result or outcome of the electronic community bingo game, then the player's award may be multiplied by M.

Alternatively, or in addition, the player may be provided with M bingo cards (instead of 1) for the respective instance of the electronic community bingo game.

Thirdly, the system 10 may provide/run a plurality of electronic community bingo games, which may be run in parallel on the same controller/server or additional controllers or servers. The additional electronic community bingo games may have the same parameters, e.g., period, qualifying factor, pay tables, etc. . . . , or one or more of the parameters may be different. Each player's accumulated factor may be used to qualify the player for one or more of the plurality of electronic community bingo games.

In general, these approaches may be used singularly or combined. In one aspect, each method may be used to modify a parameter of the electronic community bingo game, by a factor which is less than or equal to M, as long as the total number of modifications was equal to M.

In one embodiment, these variations are predetermined. In another embodiment, the parameters of the system 10 may be set or configured by the operator of the system 10. In still another embodiment, at least some of the parameters of system 10 may by at least partly configured by the players. In a further embodiment, at least some of the parameters of the system 10 are preset and/or configurable by a player and/or the operator.

It should be noted that the above examples, the players are using a roughly consistent rate of playing/wagering on the base game. The rate at which a player places wagers or plays the base game will naturally vary. However, prior to initialization of each electronic community bonus game, each player's accumulated factor will be evaluated to determine if the respective player has qualified for that instance of the electronic community bingo game.

Figure 5:
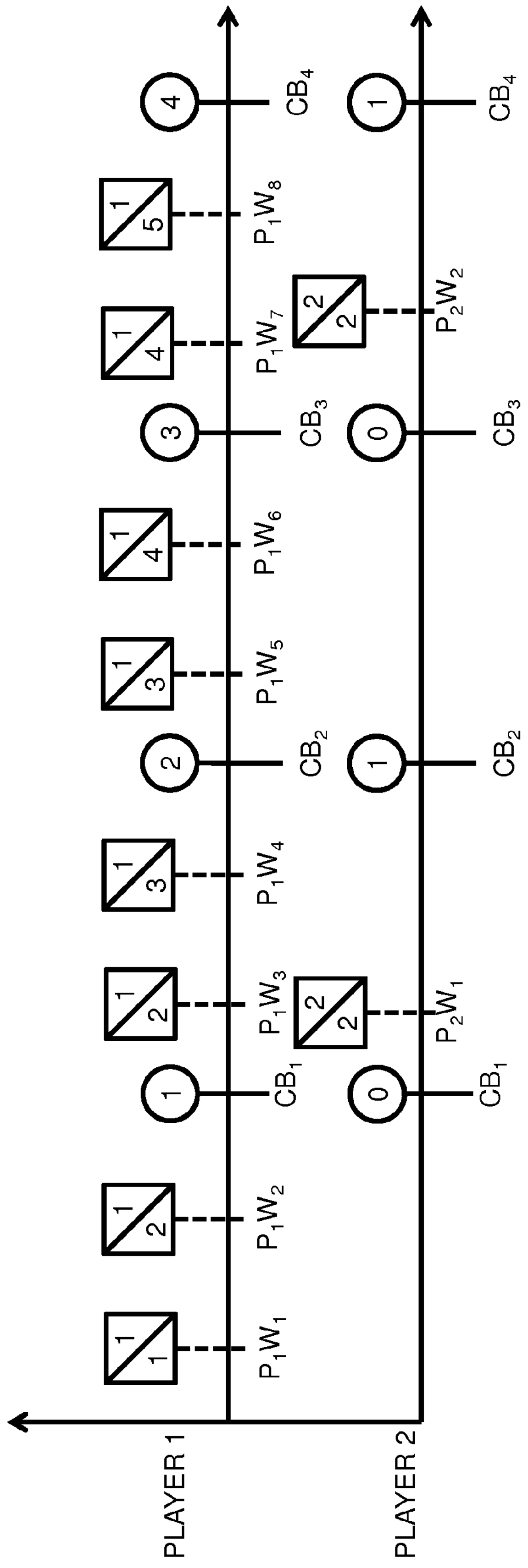
FIG. 5 is a third time line illustrating a third exemplary operation of the present invention, according to an embodiment of the present invention; and, FIG. 6 is a fourth time line illustrating a fourth exemplary operation of the present invention, according to an embodiment of the present invention.
Figure 6:
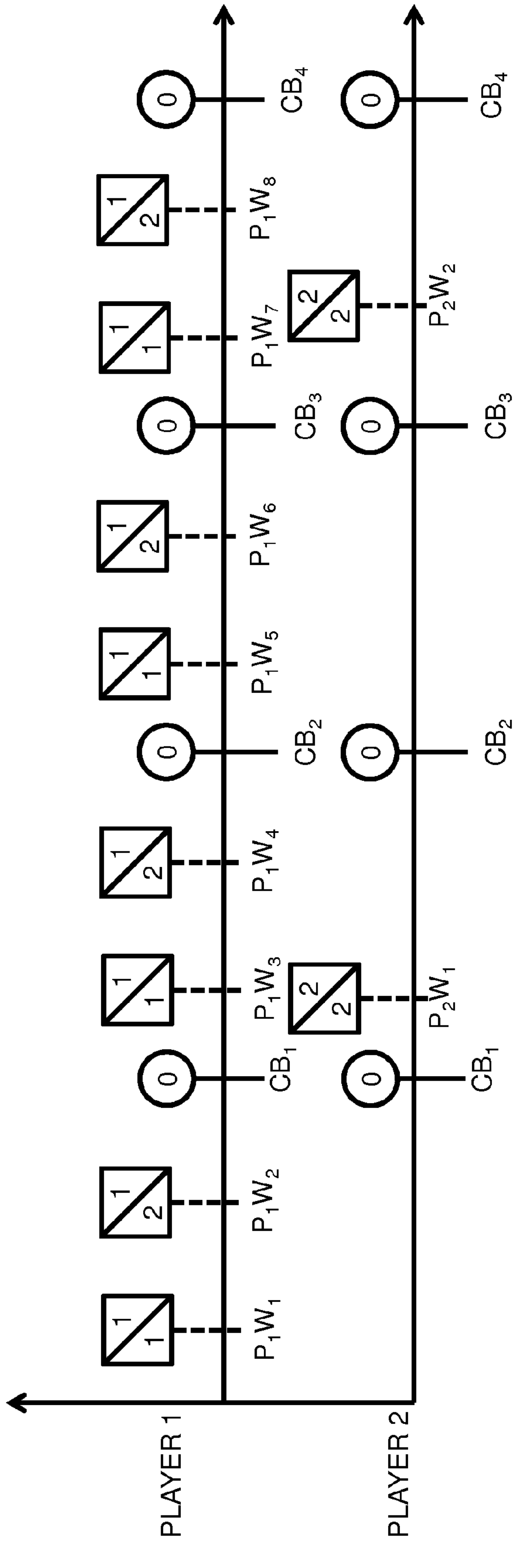

With specific reference to FIG. 5 in this example, Player 1 is playing the base game, with a standard wager, twice during each period of the electronic community bingo game. Furthermore, in this example, the qualifying factor is 1 per standard wager and the minimum qualifying factor (or cost basis) for the electronic community bingo game is 1.

As shown, Player 1 makes a standard wager and plays the base game at times $P_1W_1$ and $P_1W_2$, which is before the first electronic community bingo game at $CB_1$. At $CB_1$, Player 1's accumulated factor is 2, which is 2× the minimum qualifying factor of the electronic community bingo game.

As discussed above, in one embodiment Player 1 qualifies and is entered into the first instance of the electronic community bingo game at $CB_1$ and the cost basis of 1 is subtracted from Player 1's accumulated factor. In this scenario, Player 1 continues to play at the same rate, i.e., ~2× the period of the electronic community bingo game. Thus, the accumulated factor will continue to increase faster than it is used to qualify the player for the electronic community bingo game, i.e., Player 1's aggregate factor is 2, 3, and 4 at $CB_2$, $CB_3$, and $CB_4$, respectively. As discussed above, when the player stops playing, the system 10 may either qualify the player for instances of the electronic community bingo game or store the accumulated factor for later.

Alternatively as discussed above, the system 10 may modify the player's entry into the electronic community bingo game by one or more of the following: multiplying any award awarded to the player by a multiplier, providing the player more than one bingo card for play during the respective instance of the electronic community bingo game, and/or entering the player into more than one electronic community bingo game (which is/are run in parallel) or some other suitable modification. In this situation a multiple of the cost basis or minimum qualifying factor is subtracted from the player's accumulated factor. This is shown in the top half of FIG. 6, in which Player 1 plays at the same rate as in FIG. 5. However, in this example a multiplier (M) of 2 is used. This, after each electronic community bingo game, the cost basis of Mx the qualifying factor, or 2×1, is subtracted from Player 1's aggregate factor.

Returning to FIG. 5, Player 2 is playing at roughly ¼ of the rate of Player 1, however, Player 2 is playing at 2× the standard wager. Player 2 does not play the base game prior to $CB_1$, thus Player 2 does not qualify for the first instance of the electronic community bingo game at $CB_1$. Player 2's first wager is at $P_2W_1$. Since Player 2 wagered 2× the standard wager, the qualifying factor achieved is 2 and Player 2's accumulated factor is also 2 (wager indicia at $P_2W_1$). At initialization of the second instance of the electronic community bingo game, Player 2 is qualified and entered. Again, as above, Player 2 could be entered into the second instance of the electronic community bingo game and the minimum qualifying factor, in this case 1, is subtracted from Player 2's accumulated factor, leaving an aggregate factor of 0 (electronic community bingo game indicia at $CB_2$). Player 2 does not make a wager on the base game between $CB_2$ and $CB_3$, thus Player 2's aggregate factor remains at 0 and Player 2 does not qualify for the electronic community bingo game at $CB_3$. Player 2 makes another wager of 2× the standard wager at $P_2W_2$. Thus, Player 2's aggregate factor at $P_2W_2$ is 2 (wager indicia at $P_2W_2$). Player 2, therefore qualifies for the electronic community bingo game at $CB_4$. Player 2's aggregate factor is reduced by 1, leaving an aggregate factor of 1 (electronic community bingo game indicia at $CB_4$).

Alternatively, the system 10 may utilize the accumulated factor as a multiplier in one or more of the ways described above. As shown, in the lower half of FIG. 6, in which Player 2 plays at the same rate as in FIG. 5. However, in this example a multiplier (M) of 2 is used. This, after each electronic community bingo game in which Player 2 qualifies, the cost basis of Mx the qualifying factor, or 2×1, is subtracted from Player 2's aggregate factor. Thus, at both $CB_2$ and $CB_4$, Player 2 aggregate factor is 0.

In another aspect of the present invention, a method provides an electronic base game and an electronic community bingo game. The method includes the steps of allowing a first player to place wagers on the base game and the electronic community bingo game, allowing a second player to place wagers on the base game and the electronic community bingo game, and providing the electronic community bingo game to the first and second players. The electronic community bingo game is initiated on a predetermined periodic time period and has a predetermined qualifying basis. Each player's entry into the electronic community bingo game is normalized as a function of the respective player's wagers and the predetermined qualifying basis.

Obviously, many modifications and variations of the present invention are possible in light of the above teachings. The invention may be practiced otherwise than as specifically described within the scope of the appended claims.

What is claimed is:

1. A game system for providing an electronic community bingo game, said game system comprising:

a first game device including:

at least one of a bill validator, a coin acceptor, a ticket reader, and a card reader, and a first user interface, including a first display device, the first game device configured to:

facilitate a purchase of a first electronic bingo card for a base game by a first player via the first user interface, receive a wager on the base game and the electronic community bingo game via the first user interface, the base game being initiated on the first device at a first rate determined by the first player, the electronic community bingo game being initiated on the first device at a predetermined rate that is independent of the first rate of the base game on the first device, and display a first visual representation of a base game outcome and a second visual representation of a community bingo game outcome using the first display device;

a second game device including:

at least one of a bill validator, a coin acceptor, a ticket reader, and a card reader, and a second user interface, including a second display device, the second game device configured to:

facilitate a purchase of a second electronic bingo card for the base game by a second player via the second user interface, receive a wager on the base game and the electronic community bingo game via the second user interface, the base game being initiated on the second device at a second rate determined by the second player, the electronic community bingo game being initiated on the second device at the same predetermined rate that is independent of the first rate and the second rate, and display a third visual representation of the base game outcome and a fourth visual representation of the community bingo game outcome using the second display device; and a bonus game controller coupled to the player game devices and configured to provide the electronic community bingo game to the first and second players, wherein the electronic community bingo game is initiated on a predetermined periodic time period independent of the first rate and the second rate, wherein a qualifying factor, based on at least one of each play of the base game and a contribution to a community bingo game pool of funds from a respective player's wager, is established for each player after each wager made by the respective player and the community bingo game qualifying factor is added to a respective aggregate factor for each player, wherein each player is qualified for the next instance of the electronic community bingo game if the respective aggregate factor is greater or equal to a minimum qualifying factor, wherein the bonus game controller is configured to establish an outcome of each instance of the electronic community bingo game, wherein the electronic community bingo game has an associated cost factor, wherein the cost factor is subtracted from the aggregate factor of each player if the player has qualified for the next electronic community bingo game.

2. The game system, as set forth in claim 1, wherein each player's entry into the electronic community bingo game is normalized as a function of the respective player's wagers and a predetermined qualifying factor, wherein in normalizing the first player's entry into the electronic community bingo game, the first player's entry into the electronic community bingo game is qualified as a function of at least one of the frequency and size of the wagers made by the first player at the first game device and the first player is entered into a first next instance of the electronic community bingo game after the first player qualifies.

3. The game system, as set forth in claim 2, wherein in normalizing the second player's entry into the electronic community bingo game, the second player is qualified for entry into the electronic community bingo game as a function of at least one of the frequency and size of the wagers made by the second player places at the second game device and the second player is entered into a second next instance of the electronic community bingo game after the second player qualifies.

4. The game system, as set forth in claim 1, the bonus game controller configured to award an award to each player who has qualified for the respective instance of the electronic community bingo game as a function of the community bingo game qualifying factor, an electronic community bingo game pay table, and the outcome of the respective instance of the electronic community bingo game.

5. The game system, as set forth in claim 4, wherein a qualifying player is provided at least one community bingo card for each instance of the electronic community bingo for which the qualifying player qualifies.

6. The game system, as set forth in claim 5, wherein the number of qualifying bingo cards provided to the qualifying player for each instance of the electronic community game is a function of the community bingo game qualifying factor.

7. The game system, as set forth in claim 4, wherein the bonus game controller establishes an initial award value as a function of the outcome of the electronic community bingo game and the electronic community bingo game pay table, the award being a function of the initial award value and the community bingo game qualifying factor.

8. The game system, as set forth in claim 7, wherein a multiplier is established as a function of the community bingo game qualifying factor, wherein the award is established by multiplying the initial award value by the multiplier.

9. The game system, as set forth in claim 8, wherein the electronic community bingo game outcome includes a matching condition of an interim or game-ending pattern on the least one community bingo card.

10. The game system, as set forth in claim 8, wherein the bonus game controller or the respective player game device performs at least one of the following for the respective player:

multiplies any award awarded by the respective instance of the electronic community bingo game by the multiplier;

provides a plurality of bingo cards for the respective player in the respective instance of the electronic community bingo game; and wherein the electronic community bingo game controller provides a plurality of electronic community bingo game and enters the respective player into a plurality of electronic community bingo games.

11. The game system, as set forth in claim 1, wherein each of the first game device and the second game device further comprises a game controller for playing the base game, wherein the base game is an electronic base bingo game, the game controller for establishing at least one base bingo card for the base game for each player and the base game outcome, the base game outcome including an award if a set of predetermined winning conditions has been achieved.

12. The game system, as set forth in claim 11, wherein the base game outcome includes a matching condition of an interim or game-ending pattern on the respective bingo card.

13. The game system, as set forth in claim 12, wherein the game controller is implemented in a game server.

14. The game system, as set forth in claim 13, wherein the bonus game controller is implemented in a community bingo game server.

15. The game system, as set forth in claim 13, wherein the bonus game controller is implemented in the game server.

16. The game system, as set forth in claim 1, wherein the bonus game controller or the respective player game device determines if the aggregate factor of each player is greater than a multiple of the cost factor and responsively:

modifies the next instance of the electronic community bingo game for the respective player; and subtracts the product of the multiple and the cost from the aggregate factor of the respective player.

17. The game system, as set forth in claim 1, wherein the bonus game controller or the respective player game device determines if the aggregate factor of each player is greater than a multiple of the cost factor and responsively:

modifies the next instance of the electronic community bingo game for the respective player; and subtracts the product of the multiple and the cost from the aggregate factor of the respective player.

18. The game system, as set forth in claim 17, wherein the bonus game controller or the respective player game device, performs at least one of the following for the respective player:

multiplies any award awarded by the respective instance of the electronic community bingo game by the multiplier;

provides a plurality of bingo cards for the respective player in the respective instance of the electronic community bingo game; and wherein the electronic community bingo game controller provides a plurality of electronic community bingo game and enters the respective player into a plurality of electronic community bingo games.

19. The game system as set forth in claim 1, wherein the bonus game controller is further configured to determine if the aggregate factor of each player is greater than a multiple of the cost factor and responsively:

modifying the next instance of the electronic community bingo game for the respective player; and subtracting the product of the multiple and the cost from the aggregate factor of the respective player.

20. A method for providing an electronic base game and an electronic community bingo game, said method including the steps of receiving wagers on the base game and the electronic community bingo game for a first player using at least one of a bill validator, a coin acceptor, a ticket reader, and a card reader of a first game machine;

receiving wagers on the base game and the electronic community bingo game for a second player using at least one of a bill validator, a coin acceptor, a ticket reader, and a card reader of a second game machine;

providing the electronic community bingo game to the first and second players, wherein the electronic community bingo game is initiated on a predetermined periodic time period;

establishing a qualifying factor for each player after each wager made by the respective player;

adding the community bingo game qualifying factor to a respective aggregate factor for each player;

qualifying each player for the next instance of the electronic community bingo game if the respective aggregate factor is greater or equal to a minimum qualifying factor; and establishing an outcome of each instance of the electronic community bingo game, wherein the electronic community bingo game has an associated cost factor, wherein the cost factor is subtracted from the aggregate factor of each player if the player has qualified for the next electronic community bingo game.

21. The method, as set forth in claim 20, wherein each player's entry into the electronic community bingo game is normalized as a function of the respective player's wagers and a predetermined qualifying factor, the method including the steps of qualifying the first player for entry into the electronic community bingo game as a function of at least one of the frequency and size of the wagers made by the first player and entering the first player into a first next instance of the electronic community bingo game after the first player qualifies.

22. The method, as set forth in claim 21, including the steps of qualifying the second player for entry into the electronic community bingo game as a function of at least one of the frequency and size of the wagers made by the second player places and entering the second player into a second next instance of the electronic community bingo game after the second player qualifies.

23. The method, as set forth in claim 20, including the steps of establishing a community bingo game qualifying factor for each player after each wager made by the respective player, establishing an outcome of each instance of the electronic community bingo game and awarding an award to each player who has qualified for the respective instance of the electronic community bingo game as a function of the community bingo game qualifying factor, an electronic community bingo game pay table, and the outcome of the respective instance of the electronic community bingo game.

24. The method, as set forth in claim 23, wherein a qualifying player is provided at least one community bingo card for each instance of the electronic community bingo for which the qualifying player qualifies.

25. The method, as set forth in claim 24, wherein the number of qualifying bingo cards provided to the qualifying player for each instance of the electronic community game is a function of the community bingo game qualifying factor.

26. The method, as set forth in claim 22, including the steps of establishing an initial award value as a function of the outcome of the electronic community bingo game and the electronic community bingo game pay table, the award being a function of the initial award value and the community bingo game qualifying factor.

27. The method, as set forth in claim 26, including the step of establishing a multiplier as a function of the community bingo game qualifying factor, wherein the award is established by multiplying the initial award value by the multiplier.

28. The method, as set forth in claim 27, wherein the outcome of the electronic community bingo game includes a matching condition of an interim or game-ending pattern on the least one community bingo card.

29. The method, as set forth in claim 27, at least one of the following steps is performed for the respective player:

multiplying any award awarded by the respective instance of the electronic community bingo game by the multiplier;

providing a plurality of bingo cards for the respective player in the respective instance of the electronic community bingo game; and wherein the electronic community bingo game controller provides a plurality of electronic community bingo game, entering the respective player into a plurality of electronic community bingo games.

30. The method, as set forth in claim 20, wherein the base game is an electronic base bingo game, the method including the steps of establishing at least one base bingo card for the base game for each player and a result of the electronic base bingo game, the outcome of the electronic base bingo game including an award if a set of predetermined winning conditions has been achieved.

31. The method, as set forth in claim 30, wherein the result includes a matching condition of an interim or game-ending pattern on the respective bingo card.

32. The method, as set forth in claim 20, including the step of determining if the aggregate factor of each player is greater than a multiple of the cost factor and responsively:

modifying the next instance of the electronic community bingo game for the respective player; and subtracting the product of the multiple and the cost from the aggregate factor of the respective player.

33. The method, as set forth in claim 32, at least one of the following steps is performed for the respective player:

multiplying any award awarded by the respective instance of the electronic community bingo game by the multiplier;

providing a plurality of bingo cards for the respective player in the respective instance of the electronic community bingo game; and wherein the electronic community bingo game controller provides a plurality of electronic community bingo game, entering the respective player into a plurality of electronic community bingo games.

34. A game system for providing an electronic community bingo game, comprising:

a first game device configured to receive wagers on a base game and the electronic community bingo game for a first player using at least one of a bill validator, a coin acceptor, a ticket reader, and a card reader of the first game device;

a second game device configured to receive wagers on the base game and the electronic community bingo game for a second player using at least one of a bill validator, a coin acceptor, a ticket reader, and a card reader of the second game device; and a bonus game controller coupled to the player game devices for providing the electronic community bingo game to the first and second players, wherein the electronic community bingo game is initiated on a predetermined periodic time period and has a predetermined qualifying basis, wherein each player's entry into the electronic community bingo game is normalized as a function of the respective player's wagers and the predetermined qualifying basis, wherein a community bingo game qualifying factor is established for each player after each wager made by the respective player and the community bingo game qualifying factor is added to a respective aggregate factor for each player, wherein each player is qualified for the next instance of the electronic community bingo game if the respective aggregate factor is greater or equal to a minimum qualifying factor, the bonus game controller for establishing an outcome of each instance of the electronic community bingo game and awarding an award as a function of an electronic community bingo game pay table and the outcome of the respective instance of the electronic community bingo game, wherein the electronic community bingo game has an associated cost factor, wherein the cost factor is subtracted from the aggregate factor of each player if the player has qualified for the next electronic community bingo game.

35. A method for providing an electronic base game and an electronic community bingo game, the method including the steps of:

receiving wagers on the base game and the electronic community bingo game for a first player using at least one of a bill validator, a coin acceptor, a ticket reader, and a card reader of a first game device;

receiving wagers on the base game and the electronic community bingo game for a second player using at least one of a bill validator, a coin acceptor, a ticket reader, and a card reader of a second game device;

providing the electronic community bingo game to the first and second players, wherein the electronic community bingo game is initiated on a predetermined periodic time period and has a predetermined qualifying basis, wherein each player's entry into the electronic community bingo game is normalized as a function of the respective player's wagers and the predetermined qualifying basis;

establishing a community bingo game qualifying factor for each player after each wager made by the respective player;

adding the community bingo game qualifying factor to a respective aggregate factor for each player;

qualifying each player for the next instance of the electronic community bingo game if the respective aggregate factor is greater or equal to a minimum qualifying factor; and establishing an outcome of each instance of the electronic community bingo game and awarding an award as a function of an electronic community bingo game pay table and the outcome of the respective instance of the electronic community bingo game, wherein the electronic community bingo game has an associated cost factor, wherein the cost factor is subtracted from the aggregate factor of each player if the player has qualified for the next electronic community bingo game.

* * * * *